(12) United States Patent
Ribeiro et al.

(10) Patent No.: US 8,326,601 B2
(45) Date of Patent: Dec. 4, 2012

(54) QUEUE BASED MECHANISM TO SUPPORT MULTI-LANGUAGE CHAT ROOMS

(75) Inventors: Helvecio Carneiro Ribeiro, Bellevue, WA (US); Ambika Singh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 12/369,358

(22) Filed: Feb. 11, 2009

(65) Prior Publication Data

US 2010/0204981 A1 Aug. 12, 2010

(51) Int. Cl.
G06F 17/20 (2006.01)
(52) U.S. Cl. ............... 704/8; 704/2; 704/5; 704/277
(58) Field of Classification Search ............... 704/1–10, 704/277, 251, 257, 255, 270
See application file for complete search history.

(56) References Cited

U.S. PATENT DOCUMENTS

| | | | | |
|---|---|---|---|---|
| 4,864,503 | A * | 9/1989 | Tolin | 704/2 |
| 5,526,259 | A * | 6/1996 | Kaji | 704/3 |
| 5,732,276 | A * | 3/1998 | Komatsu et al. | 704/1 |
| 6,292,769 | B1 * | 9/2001 | Flanagan et al. | 704/3 |
| 7,451,188 | B2 | 11/2008 | Cheung et al. | |
| 2004/0030781 | A1 | 2/2004 | Etesse et al. | |
| 2007/0143410 | A1 | 6/2007 | Kraft et al. | |
| 2008/0177528 | A1 | 7/2008 | Drewes | |

OTHER PUBLICATIONS

ASP.NET Chat Pro http://www.iis.net/downloads/default.aspx?tabid=34&g=6&i=1410. Last accessed Dec. 3, 2008, 3 pages.
Multi Operators Live Chat 3.0.1.5 http://www.5starshare.com/Multi_Operators_Live_Chat-soft67138.html. Last accessed Dec. 3, 2008, 2 pages.
Globalink and Uni-Verse Create First Multilingual Chat Room with Real-Time Translation, Mar. 21, 1997. http://findarticles.com/p/articles/mi_m0EIN/is_/ai_19233933. Last accessed Dec. 3, 2008, 5 pages.
Real-Time Live Chatting http://www.wsilivechat.com/dynamicdata/data/WSI%20Live%20Chat%20Solution%20Features.pdf. Last accessed Dec. 3, 2008, 11 pages.
Multicity.com Introduces First Instant Translation Tool for Online Chat Rooms http://www.multicity.com/about/press/pressreleases/2000/pr11.htm. Last accessed Dec. 3, 2008, 2 pages.
Chat Room http://en.wikipedia.org/wiki/Chat_room. Last accessed Dec. 1, 2008, 3 pages.
Oikarinen, et al. RFC 1459—Internet Relay Chat Protocol, May 1993. http://tools.ietf.org/html/rfc1459. Last accessed Dec. 3, 2008, 66 pages.
Queuing Theory Basics http://www.eventhelix.com/realtimemantra/CongestionControl/queueing_theory.htm. Last accessed Dec. 3, 2008, 2 pages.
Wittens. UTF-8 Conversion Support for mIRC, Jul. 13, 2004. http://acko.net/blog/utf-8-mirc. Last accessed Dec. 3, 2008, 9 pages.

* cited by examiner

Primary Examiner — Huyen X. Vo
(74) Attorney, Agent, or Firm — Lee & Hayes, PLLC

(57) ABSTRACT

The claimed subject matter provides systems and/or methods that produce multilingual capabilities for use in text based chat rooms. The system can include components that receive textual messages from a first client, route these messages to a first queue, and subsequently direct the textual messages to a translation facility that transforms the language of the textual messages from a first language to a second language. The system can further include devices that supply the converted messages to a second queue that is periodically polled by a second client prior to the messages in the second language being retrieved by the second client for display on the second client in the second language.

18 Claims, 9 Drawing Sheets

QUEUE BASED MECHANISM TO SUPPORT MULTI-LANGUAGE CHAT ROOMS

BACKGROUND

Microprocessor-based devices have evolved into reliable and pervasive tools that facilitate everyday common tasks (e.g., microwave cooking, automobile ignition systems, entertainment centers, . . . ), complex mathematical computations (e.g., trending, controlling a robot, forecasting, and the like), sophisticated applications (e.g., business workflow, word processing, financial logging, electronic mail, etc.), and the like. Such devices typically include one or more processors and various types of memory as well as other components that enable efficient and robust multitasking. Incremental advances in electronics, networking, and software technologies have resulted in reduced device production costs and have correlated to decreased consumer purchasing costs, which have rendered computers (e.g., desktop, lap top, handheld, . . . ) essentially ubiquitous throughout many portions of the world.

Computing and networking technologies have transformed many important aspects of everyday life. Computers have become a household staple rather than a luxury, educational tool and/or entertainment center, and provide individuals with a tool to manage and forecast finances, control household operations like heating, cooling, lighting and security, and store records and images in a permanent and reliable medium. Networking technologies, like the Internet, have provided users with virtually unlimited access to remote systems, information and associated applications.

Text based chat rooms have been around since the early 70's initially as online forums to facilitate group communication around one or more topics. The online form model was later extended and refined with Internet Relay Chat (IRC) implementations—an open, plaintext protocol running on top of Transmission Control Protocol (TCP). The basic principle nevertheless has remained true: messages exchanged in the form of sentences typed asynchronously by users sharing a common communication channel—which have become known as chat rooms. Nevertheless, in order to fully communicate, it was assumed that users would be able to read and understand all messages sent to the room. Thirty years after the first online forums, this paradigm still holds true.

The subject matter as claimed is directed toward resolving or at the very least mitigating, one or all the problems elucidated above.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter relates to a machine implemented system that provides multilingual capabilities for text based chat rooms. The system includes devices and/or machine executable components necessary to receive messages from a first client written in a first language, route the message to a language specific first queue, direct the message from the language specific first queue to a transcription facility that converts the first language into a second language, and supplies the message in the second language to a second language specific queue, whereupon the message in the second language can presented to the user of a second client.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
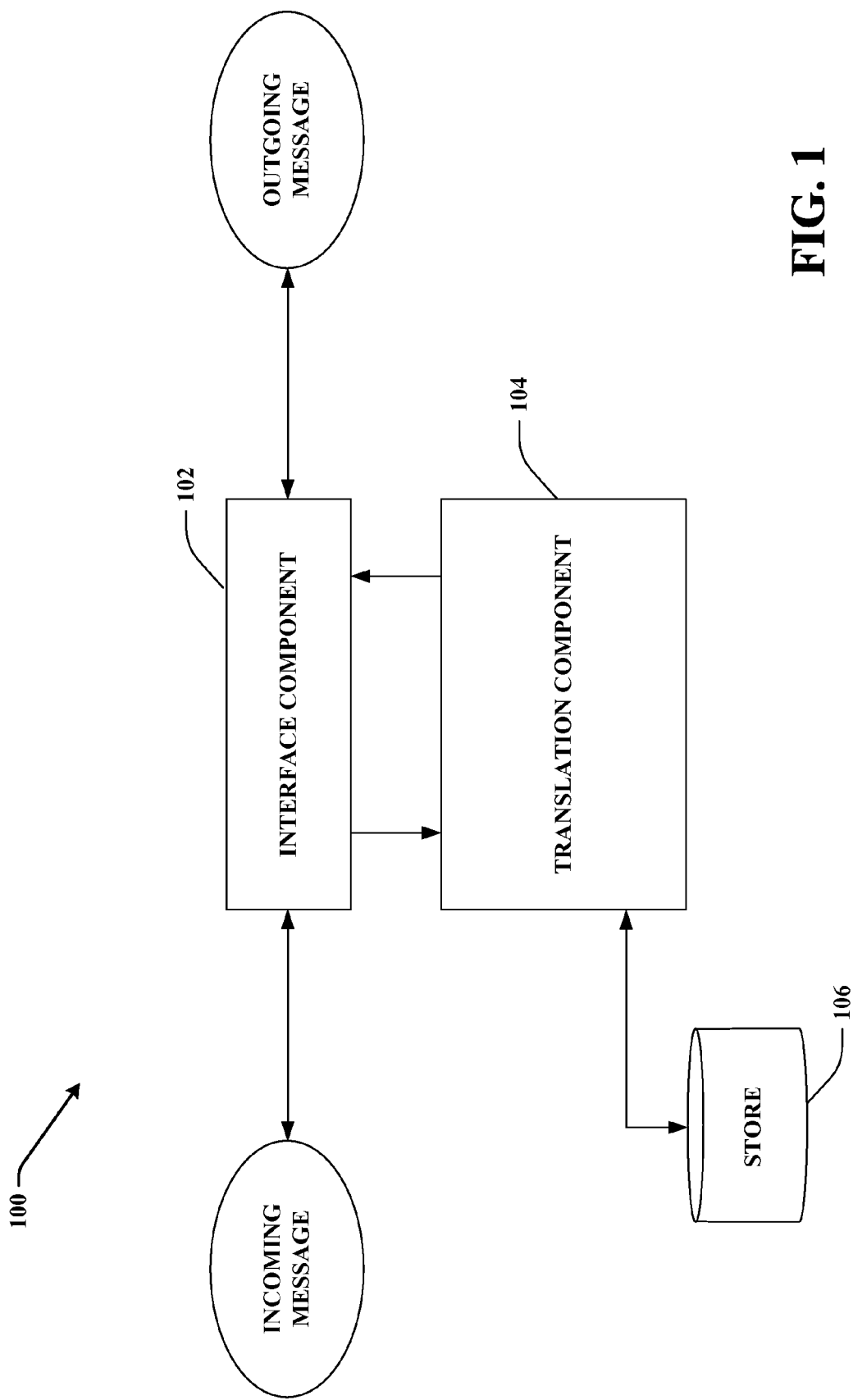
FIG. 1 illustrates a machine-implemented system that provides multilingual/multi-language capabilities for text based chat rooms in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof It may be evident, however, that the claimed subject matter can be practiced without these specific details. In other instances, well-known structures and devices are shown in block diagram form in order to facilitate a description thereof Text based chat rooms have been around since the early 1970s, first as online forums which were utilized to facilitate group communication around one or more topics. This model was later extended with Internet Relay Chat (IRC) implementations—an open, plaintext protocol running on top of transmission control protocol (TCP). The basic principle, however, remained true: messages would be exchanged in the form of sentences typed asynchronously by users sharing a common communication channel—which became known as chat rooms. In order to fully communicate, it was assumed that users would be able to read and understand all messages sent to this room. Thirty years after the emergence of the first online forums, this assumption still holds true. Accordingly, the claimed subject matter proposes an alternative to this scenario in which users would be able to select their preferred idiom, and communicate with others in his/her native tongue. Messages would then be translated automatically so that language would not be a barrier communication anymore.

The first Internet Relay Chat (IRC) implementations adopted the standard 8-bit character set, with no encoding information. For quite some time, Internet Relay Chat (IRC) clients would not support anything but ASCII and extended ASCII messages. This would naturally imply on restricting language support drastically—so even monolingual chat rooms could not sport many idioms. As chat popularity increased, so did adoption, and the 8-bit restriction was then confined to control codes—Unicode characters would be expressed in octets with the help of conversion tables and scripts, thus messages could be sent using any character set.

With advances in programming techniques, it became quite simple to develop and implement chat rooms. Currently, there are a myriad of Hypertext Transfer Protocol (HTTP) based implementations that leverage the many client/server architecture alternatives now available. That said, the vast majority of these implementations are based on a very simple concept: clients log into a common application context and share a common messaging area. Clients upload content (send messages) utilizing standard HTTP POSTs, and server-side components are responsible for merging all content in a shared application messaging area. Clients can then refresh the view of the shared content, normally filtering the data using timestamps as reference.

Modern programming languages also provide flexible frameworks that handle multiple character sets automatically—there is minimal effort required from programmers to handle messages in different languages.

Web based chat rooms built on top of this model also share another common characteristic: the server never pushes content, so it is up to the client to decide when and how to refresh the chat window.

Nevertheless the implementation challenges can be manifest and many; for instance, the idea of adding a personalization layer that would allow users to communicate with others in their own native language seems like a natural progression for chat room development. However, the challenges behind such a simple concept are many—most of them related to the number of permutations necessary to cover possible language combinations. There are also issues related to updating the common messaging area—for each sentence sent to the chat room there could be n possible translations that need to be handled. This concurrency scenario would require special coding even for enhanced designs, like rooms that use databases to implement the common messaging area—the system would have to accommodate multiple inserts for all translated sentences simultaneously.

Aside from the concurrency issues, a multi-language system would also have to consider the fact that translations are slower than the regular messaging traffic, and that the translation time can vary significantly from one language selection to another. Ideally, results should be presented as they are made available, allowing users to read translated content as soon as it is ready.

In order to mitigate the foregoing implementation challenges, the claimed subject matter utilizes queues to help mitigate differences in process performance. Using multiple queues to compensate for the speed differences can allow a multi-language chat system to work as follows. First, messages sent by a first client in a first language can arrive at the server and then can be routed to an appropriate queue. Next, multiple processes can monitor the queues, submitting each new message to a translation system. Once the translation has been completed, the translated message can be routed to a queue from which a second client can periodically fetch content when the second client is refreshing the chat window on the second client, wherein the content displayed in the chat window on the second client is, wholly or partially, in the translated second language. The mechanism employed by the claimed subject matter would therefore imply extending the use of the queues so that they become segmented views of the common messaging area.

FIG. 1 illustrates system 100 that provides multilingual capabilities for text based chat rooms. System 100 can include interface component 102 (hereinafter referred to as "interface 102") that can receive messages in a first language from a first client and can dispatch the messages in one or more second languages to a second client. Upon receipt of the messages in the first language from the first client, the messages can be conveyed to translation component 104 for translation, analysis, and processing. Once translation, processing, and analysis have been performed by translation component 104 (e.g., the messages in the first language have been transcribed into received messages translated into the second language) interface 102 can facilitate dispatch of the translated messages to the second client.

System 100 can also include translation component 104 that can upon receipt of messages in a first language conveyed to it by interface 102 can route the messages to one or more language specific queues whereupon each of the one or more language specific queues can be monitored, either periodically or continuously, such that the messages entered into these language specific queues can be dispatched for translation from the first language to one or more second languages. Once the translation between the first language to the one or more second languages have been complete the messages in the one or more second languages can be directed to one or more other language specific queues where a client can fetch the translated messages from the appropriate queue.

Additionally, system 100 can also include store 106 that can include any suitable data necessary for translation component 104 to facilitate it aims. For instance, store 106 can include information regarding translation dictionaries (e.g., between a first language and a second language, between a first language and an intermediate language and an intermediate language and a second language, etc.), user data, data related to a portion of a transaction, credit information, historic data related to a previous transaction, a portion of data associated with purchasing a good and/or service, a portion of data associated with selling a good and/or service, geographical location, online activity, previous online transactions, activity across disparate networks, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information obtained from the disparate network, ratings from a website, a credit score, geographical location, a donation to charity, or any other information related to software, applications, web conferencing, and/or any suitable data related to transactions, etc.

It is to be appreciated that store 106 can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). Store 106 of the subject systems and methods is intended to comprise, without being limited to, these and any other suitable types of memory. In addition, it is to be appreciated that store 106 can be a server, a database, a hard drive, and the like.

Figure 2:
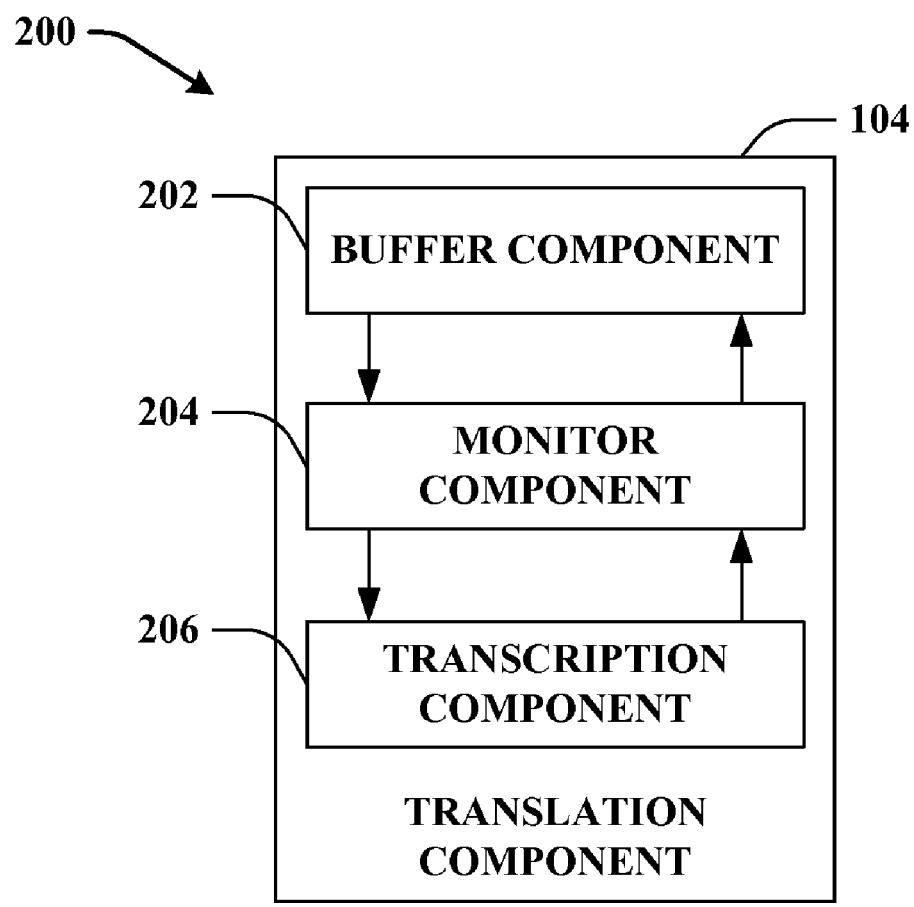
FIG. 2 provides a more detailed illustration of a translation component that provides multilingual/multi-language capabilities for text based chat rooms in accordance with an aspect of the claimed subject matter.

FIG. 2 provides a more detailed illustration 200 of translation component 104 in accordance with aspects of the claimed subject matter. As illustrated translation component 104 can include buffer component 202 that can be employed when messages in a first language are received from a first client whereupon the messages received in the first language can be directed toward a language specific queue associated with buffer component 202. It is to be understood, without limitation or loss of generality, that the language specific queue to which the messages received in the first language are directed to is specific to messages received in the first language (e.g., the queues are language specific). Thus, for example, if the messages are received in English, the language specific queue included in buffer component 202 to which such messages would be directed would be queues specifically for messages written in English. Similarly, there can be specific queues for languages such as Spanish, Portuguese, French, German, Mandarin, Hindi, etc. Further, buffer component 202 can also include other queues that can also be language specific. These other language specific queues included in buffer component 202 can be specific to a second language and can be utilized to temporarily persist the messages translated into the second language while they await collection by a client.

Additionally, translation component 104 can also include monitor component 204 that can continuously and/or periodically check each of the language specific queues included in buffer component 202 to ascertain whether or not there are messages reposited in the language specific queues. If there are messages persisted, albeit temporarily, in the language specific queues, monitor component 204 can forward theses messages to transcription component 206 for conversion between the first language and one or more second language.

Further translation component 104 can include transcription component 206 that can be employed to translate between messages written in a first language to messages written in a second language. In order to facilitate such translation, transcription component 206 can employ locally or remotely accessed databases, locally and/or remotely accessed dictionaries and/or online references, artificial intelligence and/or machine learning techniques and/or components, statistical machine translation methodologies and/or components, and the like. Once transcription component 206 has completed translation of messages from a first language to a second language, it can place the message translated into the second language in a queue reserved specifically for messages in the second language and included in buffer component 202.

As an additional feature, transcription component 206 can effectuate translation between messages in a first language to messages in an intermediary language and from an intermediary language into a second language. This facility can be utilized where there are no direct references to translate between a first language and a second language. For example, if the message in the first language is written in Guarani and the message needs to be translated into Eskimo-Aleut, transcription component 206 can translate the first language (e.g., Guarani) into an intermediate language (e.g., Spanish), translate the intermediate language into a further intermediate language (e.g., French) and subsequently translate the further intermediate language (e.g., French) into the second language (e.g., Eskimo-Aleut) which can be placed in a language specific (e.g., Eskimo-Aleut) queue included in buffer component 202. It should be noted that while transcription component 206 is translating the first language (e.g., Guarani) into the second language (e.g., Eskimo-Aleut) the intermediate message translations (e.g., Spanish and French) can be directed to appropriate language specific queues associated with buffer component 202 for use by native speakers of those intermediary languages (e.g., Spanish and French). Thus, in the foregoing example, the intermediate Spanish translation of the message can be placed in the Spanish queue and the intermediate French translation of the message can be placed in the French queue.

Figure 3:
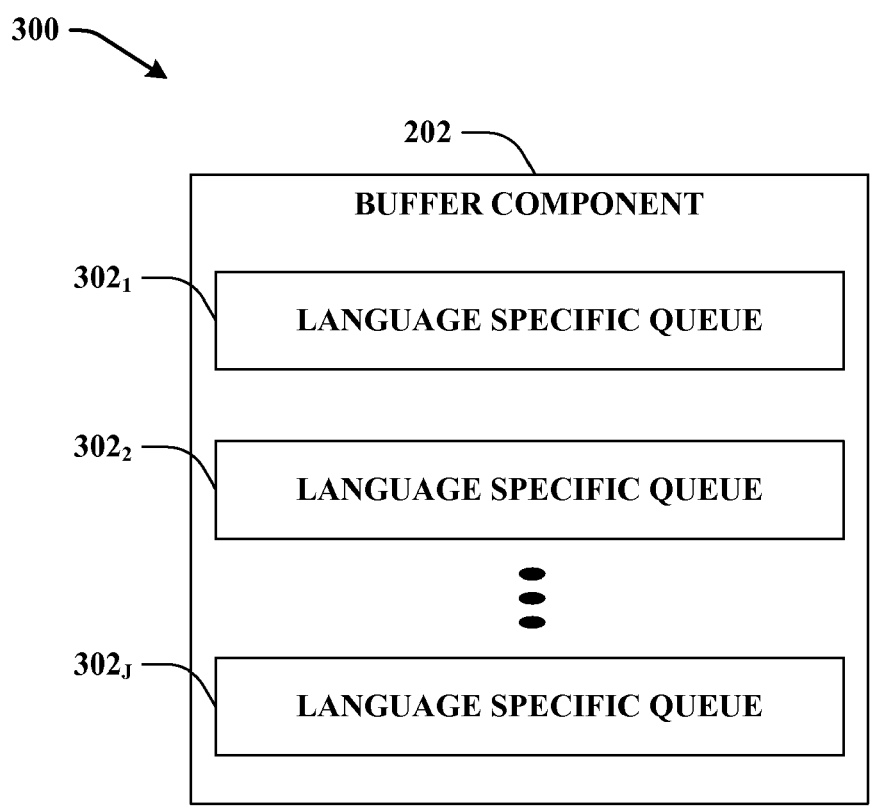
FIG. 3 provides a more detailed depiction of a buffer component that provides multilingual/multi-language capabilities for text based chat rooms in accordance with aspects of the claimed subject matter.

FIG. 3 provides a more detailed depiction 300 of buffer component 202 in accordance with aspects of the claimed subject matter. Buffer component 202 can include a first language specific queue $302_1$, a second language specific queue $302_2$, through to a $J^{th}$ language specific queue $302_J$, J being an integer greater than or equal to one. The first language specific queue $302_1$ through to the $J^{th}$ language specific queue $302_J$ can be referred to collectively as the language specific queues 302. As has been elucidated above, language specific queues 302 can be associated with any first language. Thus, there can be queues directed specifically to the major and minor spoken and/or written languages of the world (e.g., Russian, German, Uralic, Greek, Albanian, Thai, . . . ). Accordingly, when a message is received from a client a triage facility associated with interface 102 can sort and/or determine the appropriate language specific queue in which to place the incoming message. Nevertheless, where the triage facility associated with interface 102 is unable to ascertain an appropriate language specific queue to which to assign the incoming message, the incoming message can be placed in one or more queues for indeterminate languages.

Messages placed in queues for indeterminate languages can be processed and further analyzed by transcription component 206 wherein transcription component 206 can employ its greater resources and capabilities (e.g., artificial intelligence, machine learning, statistical machine translation capabilities, associated local and/or remote online resources, etc.) to ascertain the language in which the incoming message is written and/or received. It should be noted, without limitation or loss of generality, that once transcription component 206 has identified a heretofore indeterminate language, an appropriate language specific queue can be created and included in buffer component 202. For instance, if the message is received in Arakanese (a Sino-Tibetan language) the message can be directed by interface 102 to a queue allocated for languages of indeterminate origin (e.g., a queue associated with languages that system 100 has never encountered before). When transcription component 206 identifies the language as being Arakanese, transcription component 206 can notify buffer component 202 of the need to create and include additional queues directed towards this newly recognized (from the perspective of system 100) language. Thus, when further messages are received in Arakanese, interface 102 can direct these further messages into the appropriate Arakanese specific queue.

An interesting problem arises when one considers the possible language permutations required to support a complete multi-language scenario. For example, a chat room with users conversing in four different languages would typically require six bidirectional translation aspects. Generally speaking the number of translation aspects required to support a multi-language scenario can be expressed as:

$$\sum_{n=1}^{k} n^1,$$

where k=number of languages−1. Expanding the series one obtains:

$$T = \frac{k(k+1)}{2},$$

again with k=number of languages−1, and T is the total number of language aspects.

Translation engines (e.g., such as system 100) typically support a limited number of language aspects per installation. The higher the number of languages in a chat room, the higher the chances one or more combinations will not be supported by the engine in the background. In order to enable all possible permutations, unsupported combinations should be expanded in multiple combinations, translating sentences multiple times. For instance, a chat room supporting English, Chinese, and Spanish can be powered by an engine that does not implement Chinese to Spanish translations. In this case a Z-hop mechanism, where Z is an integer equal or greater than 1, can overcome this problem by implementing a Chinese to English to Spanish translation service. The foregoing Chinese to English to Spanish translation can be connoted as a 2-hop translation. Nevertheless, as will be appreciated by those of ordinary skill in this field of endeavor, without limitation or loss of generality, multiple combinations (e.g., Z-hops) can generally deteriorate the overall quality of the translation—each hop looses contextual information. That said, a chat room environment (much like any instant collaboration arena such an instant messaging environment, for example) can allow users to ask for clarification, thus somewhat mitigating the issue (e.g., users can explore other semantic constructs to empirically obtain better responses).

Figure 4:
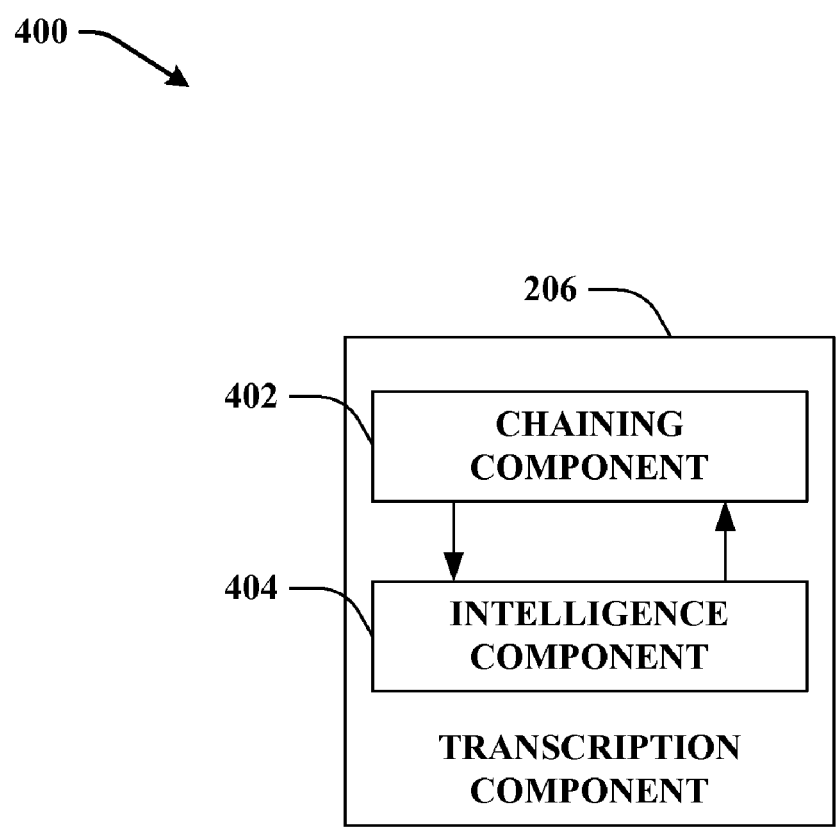
FIG. 4 provides a more detailed depiction of a transcription component that provides multilingual/multi-language capabilities for text based chat rooms in accordance with aspects of the claimed subject matter.

In light of the foregoing FIG. 4 provides a more detailed depiction 400 of transcription component 206 in accordance with aspects of the claimed subject matter. As illustrated transcription component 206 can include chaining component 402 that can effectuate the Z-hop mechanism elucidated above. Thus for instance, where participants in a chat room converse in English and Chinese and transcription component 206 is cognizant that there are no translation references to directly transform the message from English to Chinese, chaining component 402 on receipt of messages in English from the native English speaker can identify and utilize an intermediate language (e.g., Spanish) for which there are translation references necessary to translate between the two languages at issue. Thus, chaining component 402 can effectuate a translation from English to Spanish and thereafter a translation from Spanish to Chinese. Similarly, chaining component 402, on receipt of Chinese messages can effectuate translation by converting the Chinese messages into Spanish and thereafter translating the translated Spanish message into English.

Transcription component 206 in addition can include intelligence component 404 that can employ artificial intelligence, statistical machine translation, or machine learning techniques to supply multi-language capabilities for text based chat rooms in accordance with aspects of the subject matter as claimed. Accordingly, intelligence component 404 that can employ a probabilistic based or statistical based approach, for example, in connection with making determinations or inferences. Inferences can be based in part upon explicit training of classifiers (not shown) or implicit training based at least in part upon system feedback and/or users' previous actions, commands, instructions, and the like during use of the system. Intelligence component 404 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Intelligence component 404 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

Figure 5:
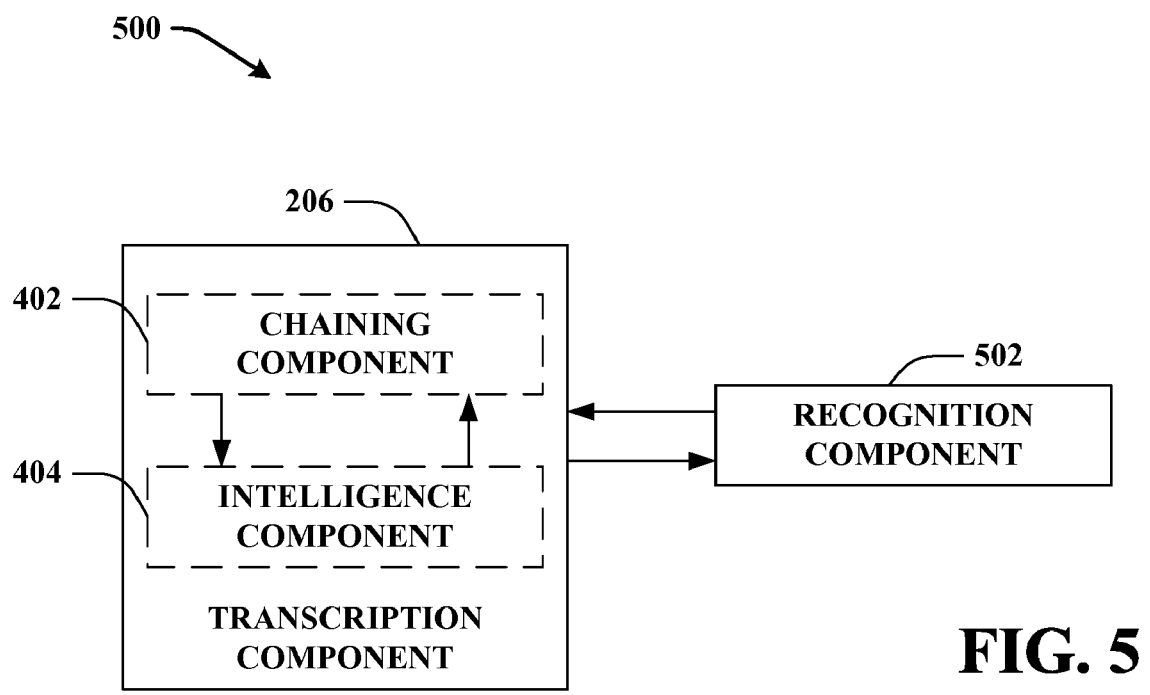
FIG. 5 provides further illustration of a transcription component wherein the transcription component utilizes a recognition component in accordance with aspects of the claimed subject matter.

FIG. 5 provides further illustration 500 of transcription component 206 wherein transcription component 206 utilizes recognition component 502 in accordance with aspects of the claimed subject matter. Recognition component 502 can be utilized in the case where spoken language needs to be translated between disparate languages. Recognition component 502 can facilitate such translation by transcribing the spoken word into a textual representation of a first language—the transcription directed to a language specific queue associated with the first language, utilizing the textual representation in the first language to convert the textual representation in the first language into a textual representation in a second language, the textual representation in the second language directed to a second language queue associated with the second language where the textual representation in the second language awaits a client to fetch the textual representation in the second language, and thereafter the client on fetching the textual representation in the second language can vocalize (e.g., using text-to-voice functionalities) the textual representation into a vocalization in the second language.

Figure 6:
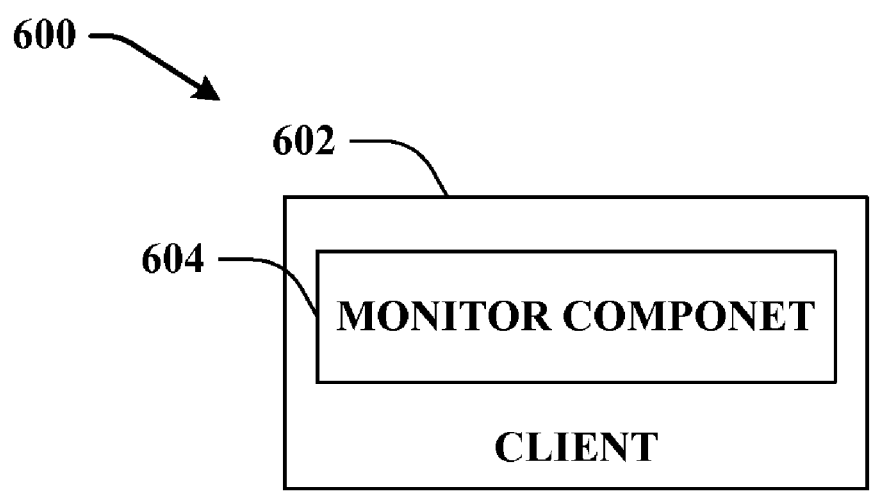
FIG. 6 provides depiction of a client component that can be employed in connection with aspects of the claimed subject matter.

FIG. 6 provides depiction 600 of a client component 602 that can be employed in connection with aspects of the claimed subject matter. As illustrated client 602 can include monitor component 604 that can continuously and/or periodically monitor the language specific queues 302 for messages relevant to the user of client component 602. For example, if the user of client 602 is a native Spanish speaker conversing in Spanish, monitor component 604 can monitor language specific queues 302 that relate to Spanish translations of messages that have been translated into Spanish. When monitor component 604 detects the presence of messages in the Spanish specific queues 302, monitor component 604 can fetch or download these messages to client 602 whereupon the downloaded messages can be presented (visually and/or through audio facilities) to the user.

Other components that can be employed and utilized by the claimed subject matter can include data fusion components that can be utilized to take advantage of information fission which may be inherent to a process (e.g., receiving and/or deciphering inputs) relating to analyzing inputs through several different sensing modalities. In particular, one or more available inputs may provide a unique window into a physical environment (e.g., an entity inputting instructions) through several different sensing or input modalities. Because complete details of the phenomena to be observed or analyzed may not be contained within a single sensing/input window, there can be information fragmentation which results from this fission process. These information fragments associated with the various sensing devices may include both independent and dependent components.

The independent components may be used to further fill out (or span) an information space; and the dependent components may be employed in combination to improve quality of common information recognizing that all sensor/input data may be subject to error, and/or noise. In this context, data fusion techniques employed herein can include algorithmic processing of sensor/input data to compensate for inherent fragmentation of information because particular phenomena may not be observed directly using a single sensing/input modality. Thus, data fusion provides a suitable framework to facilitate condensing, combining, evaluating, and/or interpreting available sensed or received information in the context of a particular application.

Additionally, the claimed matter can employ or utilize synthesizing or synthesis components to combine, or filter information received from a variety of inputs (e.g., text, speech, gaze, environment, audio, images, gestures, noise, temperature, touch, smell, handwriting, pen strokes, analog signals, digital signals, vibration, motion, altitude, location, GPS, wireless, etc.), in raw or parsed (e.g. processed) form. Through combining and filtering such synthesis can provide a set of information that can be more informative, or accurate (e.g., with respect to an entity's communicative or informational goals) than information from just one or two modalities, for example. As discussed above, the data fusion aspects of the claimed subject matter can be employed to learn correlations between different data types, and the synthesis aspects can employ such correlations in connection with combining, or filtering the input data.

Furthermore, the claimed matter can utilize contextual functionalities and/or facilities to determine context associated with a particular action or set of input data. As can be appreciated, context can play an important role with respect understanding meaning associated with particular sets of input, or intent of an individual or entity. For example, many words or sets of words can have double meanings (e.g., double entendre), and without proper context of use or intent of the words the corresponding meaning can be unclear thus leading to increased probability of error in connection with interpretation or translation thereof. The context aspects employed by the claimed subject matter can provide current or historical data in connection with inputs to increase proper interpretation of inputs. For example, time of day may be helpful to understanding an input—in the morning, the word "drink" would likely have a high a probability of being associated with coffee, tea, or juice as compared to being associated with a soft drink or alcoholic beverage during late hours. Context can also assist in interpreting uttered words that sound the same (e.g., steak and, and stake). Knowledge that it is near dinnertime of the user as compared to the user camping would greatly help in recognizing the following spoken words "I need a steak/stake".

Moreover, the claimed subject matter can employ the facilities and functionalities of presentation components that can provide various types of user interface to facilitate interaction between a user and translation component 104. Such presentation components can be separate entities and can provide one or more graphical user interface, command line interface, and the like. For example, a graphical user interface can be rendered that provides the user with a region or means to load, import, read, etc., data, and can include a region to present the results of such. These regions can comprise known text and/or graphic regions comprising dialog boxes, static controls, drop-down menus, list boxes, pop-up menus, edit controls, combo boxes, radio buttons, check boxes, push buttons, and graphic boxes. In addition, utilities to facilitate the presentation such as vertical and/or horizontal scrollbars for navigation and toolbar buttons to determine whether a region will be viewable can be employed.

Users can also interact with regions to select and provide information via various devices such as a mouse, roller ball, keypad, keyboard, and/or voice activation, for example. Typically, mechanisms such as a push button or the enter key on the keyboard can be employed subsequent to entering the information in order to initiate, for example, a query. However, it is to be appreciated that the claimed subject matter is not so limited. For example, merely highlighting a checkbox can initiate information conveyance. In another example, a command line interface can be employed. For example, the command line interface can prompt (e.g., via text message on a display and/or an audio tone) the user for information via a text message. The user can then provide suitable information, such as alphanumeric input corresponding to an option provided in the interface prompt or an answer (e.g., verbal utterance) to a question posed in the prompt. It is to be appreciated that the command line interface can be employed in connection with a graphical user interface and/or application programming interface (API). In addition, the command line interface can be employed in connection with hardware (e.g., video cards) and/or displays (e.g., black-and-white, and EGA) with limited graphic support, and/or low bandwidth communication channels.

Figure 7:
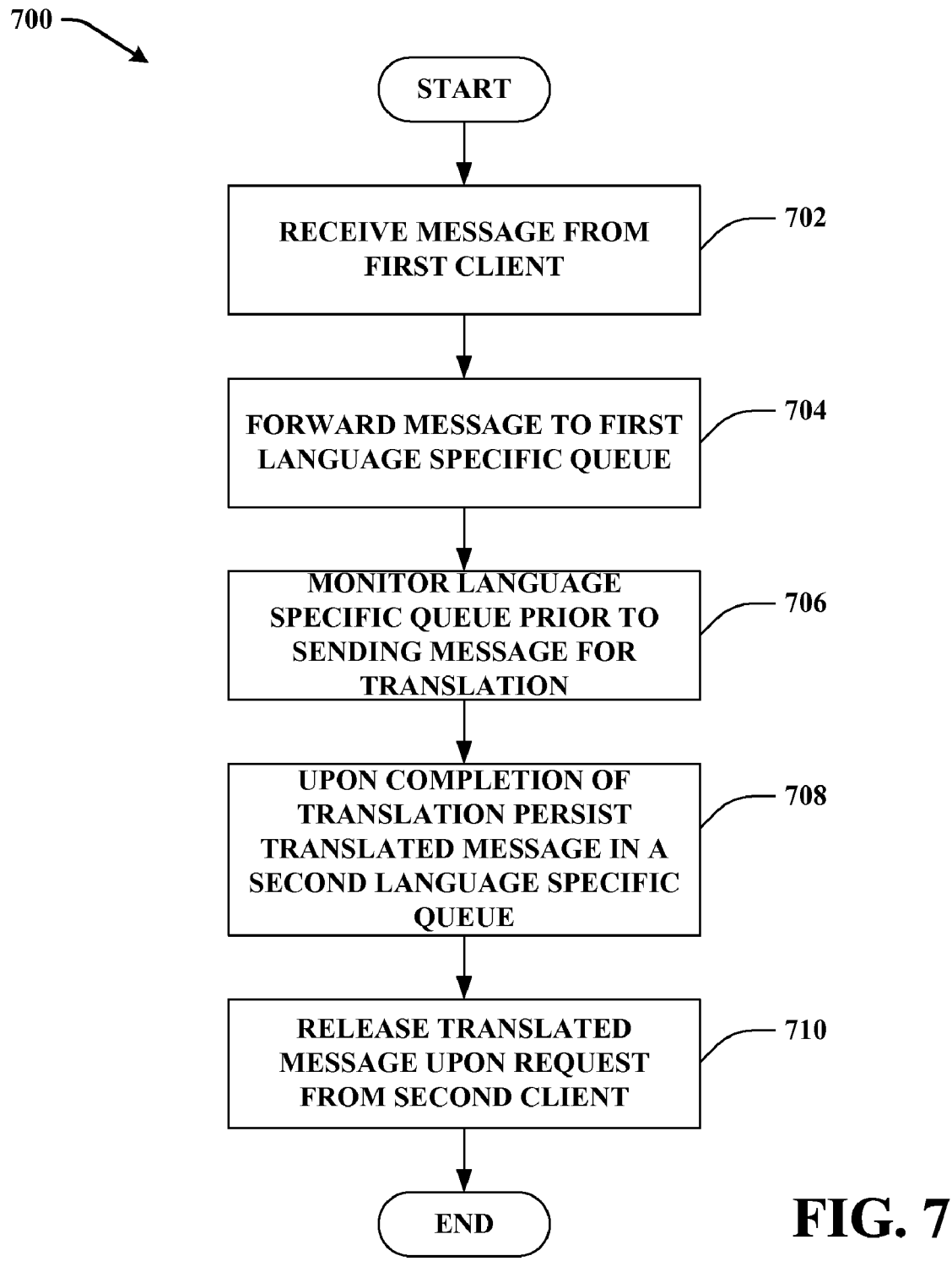
FIG. 7 illustrates a flow diagram of a machine implemented methodology that provides multilingual/multi-language capabilities for text based chat rooms in accordance with an aspect of the claimed subject matter.

In view of the illustrative systems shown and described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 illustrates a method 700 that provides multilingual capabilities for text based chat rooms in accordance with aspects of the claimed subject matter. Method 700 can commence at 702 where a message in a first language can be received from a first client, the user of the first client typically has fluency in the first language. At 704 the received message can be forwarded to a language specific queue associated with the first language. At 706 the language specific queue associated with the first language can be periodically and/or continuously monitored for the presence of messages. Where messages are detected in the language specific queue associated with the first language, these messages can be directed to a translation component that can translate the message received in the first language into a message translated into a second language. At 708 on completion of the translation from the first language into the second language the translation component can place the translated message into one or more second language specific queues associated with the second language in readiness for download by a second client whose user has fluency in the second language. At 710, on an indication received from the second client, the message translated into the second language can be released to the second client whereupon the message translated into the second language can be presented to the user.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
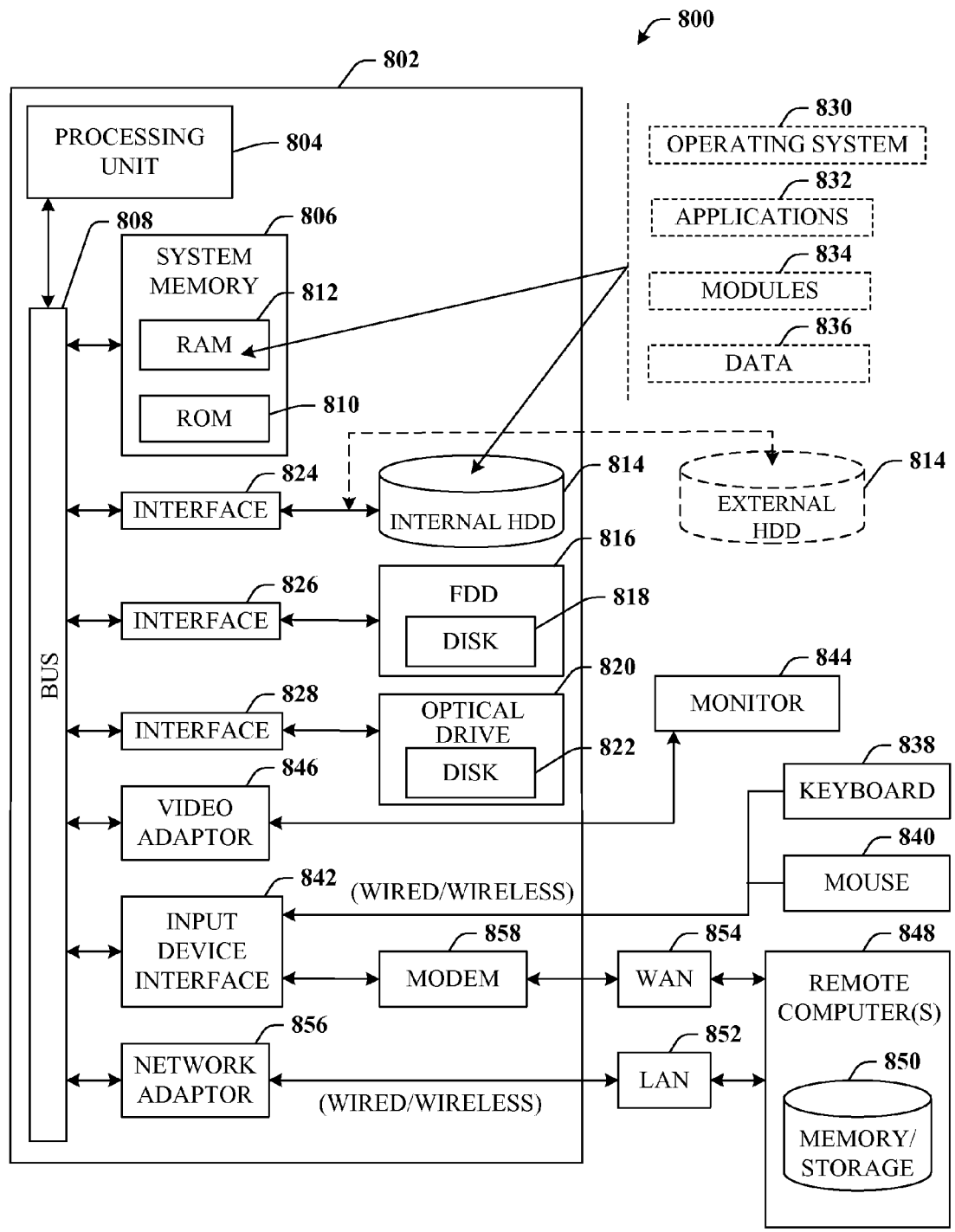
FIG. 8 illustrates a block diagram of a computer operable to execute the disclosed system in accordance with an aspect of the claimed subject matter.

Referring now to FIG. 8, there is illustrated a block diagram of a computer operable to execute the disclosed system.

In order to provide additional context for various aspects thereof, FIG. 8 and the following discussion are intended to provide a brief, general description of a suitable computing environment 800 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the illustrative environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the claimed subject matter can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1094 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated.

The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are illustrative and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 9:
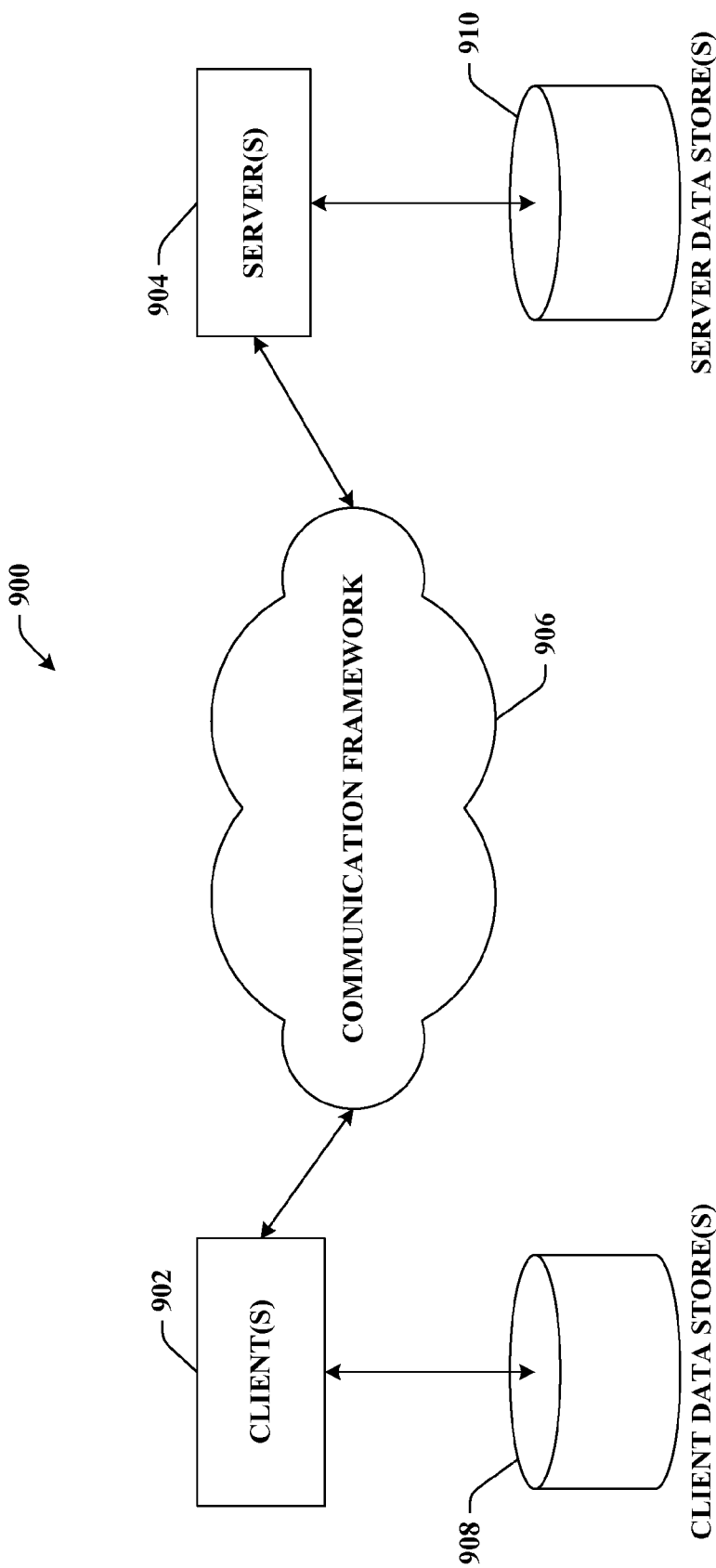
FIG. 9 illustrates a schematic block diagram of an illustrative computing environment for processing the disclosed architecture in accordance with another aspect.

Referring now to FIG. 9, there is illustrated a schematic block diagram of an illustrative computing environment 900 for processing the disclosed architecture in accordance with another aspect. The system 900 includes one or more client(s) 902. The client(s) 902 can be hardware and/or software (e.g., threads, processes, computing devices). The client(s) 902 can house cookie(s) and/or associated contextual information by employing the claimed subject matter, for example.

The system 900 also includes one or more server(s) 904. The server(s) 904 can also be hardware and/or software (e.g., threads, processes, computing devices). The servers 904 can house threads to perform transformations by employing the claimed subject matter, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that provides multilingual capabilities for text based chat rooms, the system comprising:
 memory; and
 one or more processors coupled to the memory, the one or more processors configured to act as:
  a translation component that:
   receives a message from a first client written in a first language,
   routes the message to a first language specific queue such that the message is monitored periodically and is dispatched for translation from the first language to one or more languages that are different from the first language;
   directs the message from the first language specific queue to a transcription facility that converts the first language of the message into a second language, and
   supplies the message in the second language to a second language specific queue that is reserved for messages that are translated from at least one language to the second language, the at least one language being different from the second language; and
  an interface that receives the message from the first client.

2. The system of claim 1, wherein the second language specific queue releases the message in the second language on a request from a second client, and wherein the message in the second language is displayed on the second client in the second language.

3. The system of claim 1, wherein the transcription facility converts the message in the first language into the message in the second language utilizing one or more intermediary languages.

4. The system of claim 3, wherein the transcription facility converts the message in the first language into the message in the second language utilizing a first language to intermediary language dictionary and an intermediary language to second language dictionary.

5. The system of claim 1, the one or more processors are further configured to act as a second client that monitors the second language specific queue periodically to effectuate release of the message in the second language for display on the second client.

6. The system of claim 1, wherein the transcription facility converts the message in the first language into the message in the second language utilizing one or more first language to second language dictionaries.

7. The system of claim 1, wherein the transcription facility employs one or more of machine learning, artificial intelligence or statistical machine translation to convert the message between the first language and the second language.

8. A method implemented on a machine that provides multilingual capabilities for text based chat rooms, comprising:
receiving, by one or more servers, a message from a first client;
ascertaining that the message is written in a first language;
temporarily persisting, using the one or more servers, the message in a first queue such that the message is monitored periodically to be dispatched for translation, the first queue being specific to the first language;
translating, using the one or more servers, the first language of the message into a second language; and
supplying, using the one or more servers, the message in the second language to a second queue for subsequent delivery to a second client, the second queue being specific to the second language.

9. The method of claim 8, further comprising awaiting a request from the second client prior to releasing the message in the second language stored in the second queue to the second client, the message in the second language displayed on the second client in the second language.

10. The method of claim 8, further comprising transcribing the message from the first language to the second language utilizing one or more intermediary languages.

11. The method of claim 10, wherein the transcribing further comprises employing the first language to an intermediary language dictionary and the one or more intermediary languages to a second language dictionary.

12. The method of claim 8, wherein the translating further comprises converting the message in the first language into the message in the second language utilizing one or more first language to second language dictionaries.

13. The method of claim 8, wherein the translating further comprises utilizing one or more of machine learning, artificial intelligence or statistical machine translation to convert between the first language and the second language.

14. A system translated between a first language and a second language in an online chat room, comprising:
a processor configured for:
receiving a message from a first client written in the first language,
temporarily persisting the message in a first queue that is specific to the first language,
translating the first language of the message into the second language, and
supplying the message in the second language to a second queue for subsequent delivery to a second client, the second queue being specific to the second language; and
a memory coupled to the processor for persisting data.

15. The system of claim 14, wherein the processor is further configured for monitoring the first queue periodically prior to translating the first language of the message into the second language.

16. The system of claim 14, wherein the processor is further configured for transforming the message from the first language to the second language utilizing one or more intermediary languages.

17. The system of claim 14, wherein the processor is further configured for converting the message in the first language into the message in the second language utilizing a first language to second language dictionary.

18. The system of claim 14, wherein the processor is further configured for awaiting a request from the second client prior to releasing the message in the second language to the second client, and wherein the message in the second language is displayed on the second client in the second language.

* * * * *